United States Patent
Zheng et al.

(10) Patent No.: US 6,873,501 B2
(45) Date of Patent: Mar. 29, 2005

(54) CPP SPIN VALVE HEAD WITH BIAS POINT CONTROL

(75) Inventors: Youfeng Zheng, San Jose, CA (US);
Kochan Ju, Monte Sereno, CA (US);
Simon Liao, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 68 days.

(21) Appl. No.: 10/406,119

(22) Filed: Apr. 3, 2003

(65) Prior Publication Data

US 2004/0196598 A1 Oct. 7, 2004

(51) Int. Cl.[7] ............................................. G11B 5/127
(52) U.S. Cl. .................................................. 360/324.12
(58) Field of Search ........................ 360/324.12, 324.1, 360/324.11; 29/603.14, 603.15

(56) References Cited

U.S. PATENT DOCUMENTS

| | | | |
|---|---|---|---|
| 5,627,704 | A | 5/1997 | Lederman et al. |
| 5,668,688 | A | 9/1997 | Dykes et al. |
| 5,731,937 | A | 3/1998 | Yuan |
| 5,880,912 | A | 3/1999 | Rottmayer |
| 6,201,673 | B1 * | 3/2001 | Rottmayer et al. .... 360/324.12 |
| 6,219,205 | B1 | 4/2001 | Yuan et al. ................. 360/319 |
| 6,317,297 | B1 | 11/2001 | Tong et al. .................. 360/314 |
| 6,322,640 | B1 * | 11/2001 | Xiao et al. .................... 148/308 |
| 6,347,022 | B1 | 2/2002 | Saito .......................... 360/126 |
| 6,614,630 | B2 * | 9/2003 | Horng et al. ........... 360/324.12 |
| 6,729,014 | B2 * | 5/2004 | Lin et al. ................... 29/603.14 |
| 2003/0156361 | A1 * | 8/2003 | Li et al. .................. 360/324.12 |
| 2003/0179517 | A1 * | 9/2003 | Horng et al. ........... 360/324.12 |
| 2004/0042131 | A1 * | 3/2004 | Dobisz et al. .......... 360/324.12 |

OTHER PUBLICATIONS

Matsuzono et al., "Study on Requirements for Shielded Current Perpendicular to the Plane Spin Valve Heads Based on Dynamic Read Tests", Journal of Applied Physics, vol. 91, No. 10, May 15, 2002, pp. 7267–7269.

HT–01–053, filed Sep. 10, 2002, Serial# 10/238,269, "CPP and MTJ Reader Design with Continuous Exchange––Coupled Free Layer".

* cited by examiner

Primary Examiner—Allen Cao
(74) Attorney, Agent, or Firm—George D. Saile; Stephen B. Ackerman

(57) ABSTRACT

High sensitivity in a CPP spin valve has been achieved by providing an extended free layer while maintaining good bias point control and edge domain control through use of exchange coupling with the whole free layer. In a second embodiment of the invention, a second spin valve is added so that the free layer receives filtered electrons from two directions. Processes to manufacture both embodiments are also described.

44 Claims, 3 Drawing Sheets

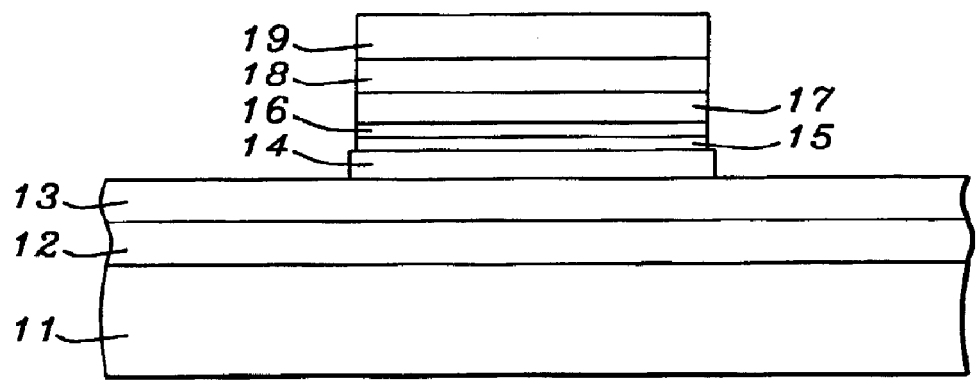
FIG. 1 – Prior Art
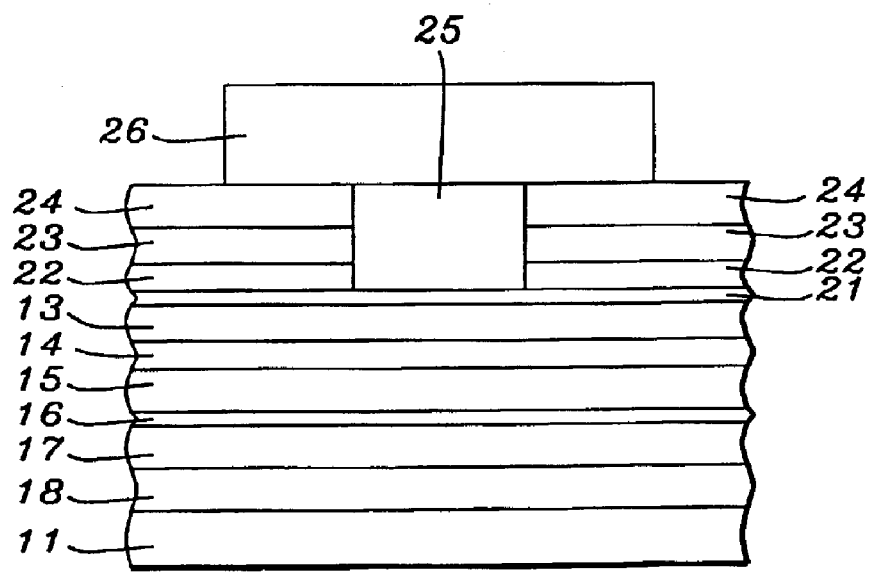
FIG. 2 – Prior Art

CPP SPIN VALVE HEAD WITH BIAS POINT CONTROL

FIELD OF THE INVENTION

The invention relates to the general field of magnetic disks with particular reference to their read heads.

BACKGROUND OF THE INVENTION

As recording densities beyond 100 Gb per sq. in. and track widths below 0.1 microns become feasible, the traditional CIP (current in film plane) spin valve head can no longer meet the required signal level because the signal amplitude of a CIP head scales with track width. CPP (current perpendicular to plane) heads then become potential candidates. CPP mode has many advantages over the CIP mode, such as higher GMR ratio (by using multilayers), good joule heat dissipation (conductor as gap material), and a signal amplitude that is independent of track width.

Pillar-type spin valve CPP heads have been built and tested [1,2]. In the pillar-type design, a contiguous hard bias scheme is needed to stabilize the free layer edge domain. However, this reduces the head sensitivity dramatically for track widths below 0.1 microns, just as in the CIP spin valve abutted junction design. It is therefore not suitable for densities beyond 100 Gb psi.

A modified pillar-type design has been proposed [3] and is shown in FIG. 1. Shield 19 sits atop antiferromagnetic layer 18 which serves to pin synthetic antiferromagnetic trilayer 15/16/17. Copper spacer layer 14 is immediately below. In this design, continuous free layer 13 remains but is exchange coupled with antiferromagnetic film 12. Micromagnetic simulation shows that the free layer sensitivity drops only about 10% for a pinning field of about 150 Oe [3]. This sensitivity is much higher than for the abutted junction case. However, in the CPP mode, the current-induced magnetic field has a circular direction within the GMR film plane. This circular field yields a buckling domain in the free layer which may cause instability and noise during head operation.

Another proposed design is the synthetic pattern exchange structure [4] seen in FIG. 2. In this scheme, the entire GMR stack, which includes free layer 13, Cu spacer layer 14, AFM pinned AP1 layer 15, and AP2 layer 17 (layer 16 being ruthenium), all extend outward to a significant extent. The track width is defined by conductor 25 at the center of the stack. The sides of the free layer are pinned by a synthetic pattern exchange layer 24/23/22. The advantage of this design is its high sensitivity and good track width definition. Due to the strong synthetic pinning strengths of the free layer side regions, the effects of circular field on the free layer can be largely eliminated. Layer 26 is the top shield.

However, this design also has several drawbacks:
(1) the extended Cu spacer layer 14 causes current leakage which results in signal loss.
(2) the large shape anisotropy in the AP layer due to the large aspect ratio results in significant deviation of the AP layer from a transverse direction; strong AP coupling is needed for this design at small dimensions.
(3) there is difficulty with bias point control. In the CIP spin valve head, there are two magnetic fields along the transverse direction (one is the stray field from the AP layers and the other is a current induced field) which counterbalance each other. In the CPP mode, however, the current field in this direction vanishes and this stray field becomes the only transverse field.

REFERENCES

[1] A. Matsuzono et al, "A Study on Requirements for Shielded CPP Spin Valve Heads based on Dynamic Read Tests", CB-02, 46h N>Iv>M conference abstract, November, 2001. (2) TDK internal presentation.

[3] Simon Liao et al, "Magnetic Tunneling Junction & CPP Reader Design With Continuous Exchange-coupled Free Layer" Headway disclosure, December, 2001.

[4] Simon Liao et al, "CPP GMR Reader With Synthetic Pattern Exchange Stabilization", Headway disclosure, December 2001.

A routine search of the prior art was performed with the following references of interest being found:

In U.S. Pat. No. 5,627,704, Lederman et al. show a MR CCP transducer structure. Dykes et al. (U.S. Pat. No. 5,668,688) show a Current Perpendicular to the plane SV MR. U.S. Pat. No. 5,731,937 (Yuan) describes a CPP GMR Transducer while in U.S. Pat. No. 6,347,022 B1, Saito shows a DSV. U.S. Pat. No. 6,219,205 B1 (Yuan et al.), U.S. Pat. No. 5,880,912 (Rottmayer) and U.S. Pat. No. 6,317,297 B1 (Tong et al.) are all related patents.

SUMMARY OF THE INVENTION

It has been an object of at least one embodiment of the present invention to provide a CPP spin valve that exhibits a minimal current induced circular domain effect.

Another object of at least one embodiment of the present invention has been to provide a CPP spin valve that has good bias point control.

Still another object of at least one embodiment of the present invention has been to provide a CPP spin valve having the higher sensitivity that is associated with an extended free layer.

A further object of at least one embodiment of the present invention has been to combine all of the improvements listed above in a single unit.

A still further object of at least one embodiment of the present invention has been to provide a process for manufacturing said CPP spin valve.

These objects have been achieved through a CPP spin valve that reduces circular field effects by means of synthetic pattern exchange pinning. The device achieves high sensitivity by providing an extended free layer while maintaining good bias point control and edge domain control through use of exchange coupling with the whole free layer. In a second embodiment of the invention, this device is provided with a second spin valve so that the free layer can receive filtered electrons from two directions. Processes to manufacture both embodiments are described.

BRIEF DESCRIPTION OF THE DRAWINGS

FIGS. 1 and 2 show CPP spin valves of the prior art

DESCRIPTION OF THE PREFERRED EMBODIMENTS

The present invention discloses two designs that solve the problems associated with the prior art designs discussed above.

Figure 5:
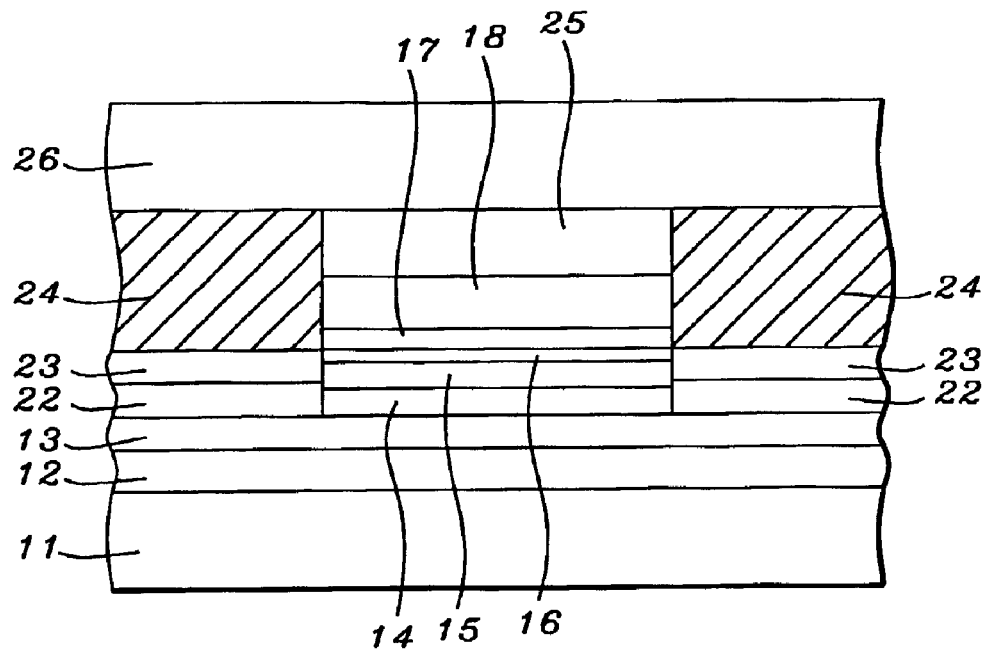
FIG. 5 shows a first embodiment of the present invention after said process has been completed.

A schematic drawing of the first embodiment is shown in FIG. 5. In this scheme, the bottom AFM layer 12 is used to help the bias point control. The synthetic pattern exchange layer 22/23 at the side wings of free layer 13 provides a stabilization scheme for the free layer. The synthetic pinning at the side region can significantly reduce the current induced circular field effect, thereby enabling large current input. No current leakage occurs since the Cu layer is patterned. Transverse pinning of the AP layer is more relaxed compared to that in the second prior art design since the AP layer shape anisotropy is much smaller than in the previous case. Also, due to the pinning of the free layer side wings, the required bottom AFM pinning strength can then be reduced compared to that of the first design.

All of the above designs have some degree of bias point control problems since none of them has another transverse field to cancel the stray field from the AP layer: The design shown in FIG. 6, referred to as a dual spin valve CPP head, can achieve an optimal bias state by adding another identical AP unit at the other side of the free layer. For example, the configuration:

AP1up13/Ru/AP2down15/Cu/free/Cu/AP3down13/Ru/AP4up15 can achieve zero stray field at the free layer and can therefore obtain an ideal bias state. For the same reason as in the design of FIG. 2, the bottom Cu spacer layer will have current leakage problems and cause signal loss. However, the GMR ratio in this dual spin valve structure is expected to be higher than that of a single spin valve structure. The signal loss due to current leakage will be more than compensated by this.

We now disclose the present invention in further detail through a description of a process for manufacturing it. In the course of so doing the structure of the present invention will also become apparent.

Figure 3:
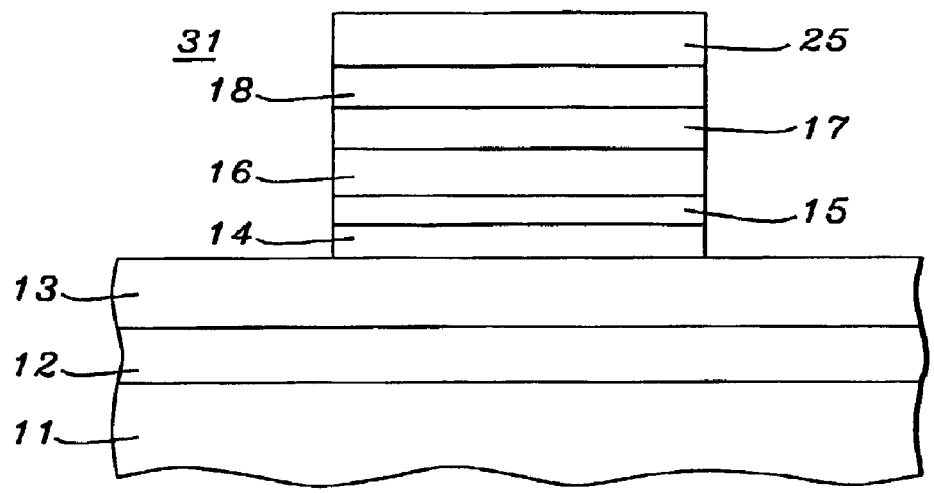
FIG. 3 illustrates an early stage in the process of the present invention.

Referring now to FIG. 3, the process of the present invention begins with the provision of lower magnetic shield 11. In addition to being ferromagnetic, the shield comprises conductive material over the ferromagnetic material so that it may also serve as a connecting lead for the device.

Bottom antiferromagnetic layer 12 is then deposited onto layer 11, followed by the deposition of free layer 13 which is between about 20 and 100 Angstroms thick. Suitable materials include, but are not limited to, NiFe, CoFe, and NiFeCo. This is followed by copper spacer layer 14 (between about 20 and 50 Angstroms thick), AP1 layer 15 (between about 15 and 30 Angstroms thick of materials such as CoFe or Co, antiferromagnetic coupling layer 16 (between about 5 and 10 Angstroms thick of materials such as Ru or Rh), AP2 layer 17 (between about 15 and 30 Angstroms thick of materials such asCoFe or Co), top antiferromagnetic layer 18 (between about 50 and 150 Angstroms thick of PtMn, IrMn, or NiMn), and conductive layer 25 (between about 100 and 300 Angstroms thick of copper or gold. Note that all of the above listed layers were deposited during a single pumpdown.

With these layers in place, the structure is ion milled (with a suitable photoresist mask, not shown, in place) to produce the pillar structure shown in FIG. 3. Pillar 31 will determine the shape and location of the spin valve stack. It has surface dimensions of about 0.1 by about 0.3 microns. End point detection during the ion milling step (at the copper-free layer interface) was achieved by means of SIMS (Secondary Ion Mass Spectrometry).

Next is the deposition of ferromagnetic bias layer 22 to a thickness between about 20 and 100 Angstroms. Suitable materials for this layer include, but are not limited to, NiFe and CoFe. This is followed by antiferromagnetic bias layer 23 to a thickness between about 50 and 150 Angstroms, suitable materials for this including PtMn, IrMn, and NiMn. Non-magnetic insulating layer 24, of materials such as aluminum oxide or tantalum oxide, is then deposited.

Figure 4:
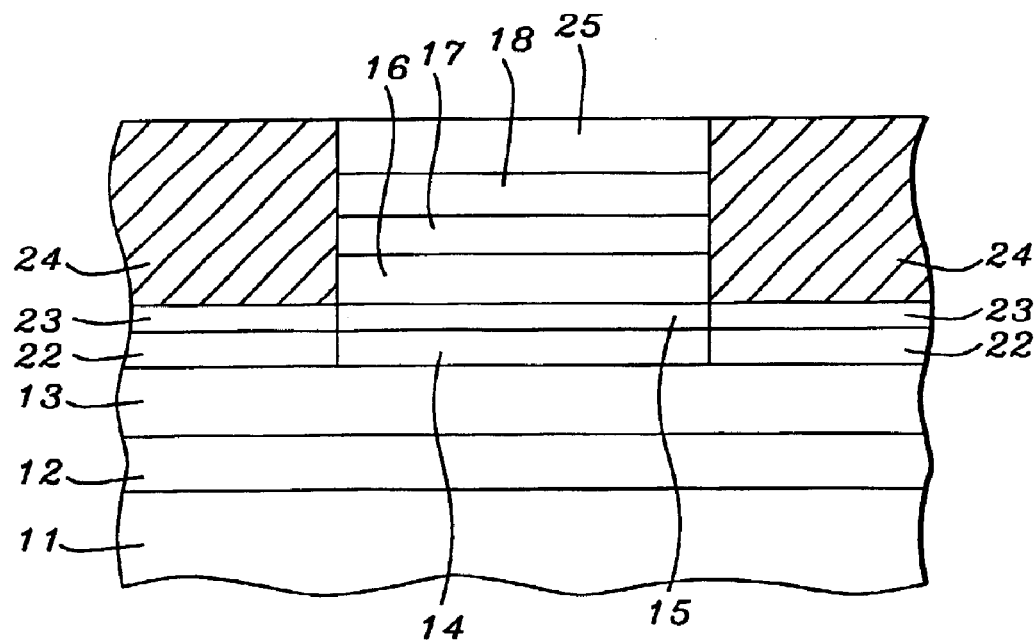
FIG. 4 shows an intermediate stage of the process of the present invention.

At this stage the structure has the appearance seen in FIG. 4. The structure is then planarized so all traces of material on layer 24 over pillar 31 are removed, following which upper magnetic shield layer 26 is laid down so the completed structure is as seen in FIG. 5. The upper magnetic shield 26 is between about 1 and 5 microns thick and is, for example, of NiFe, CoFe, CoNiFe, CoFeN.

Figure 6:
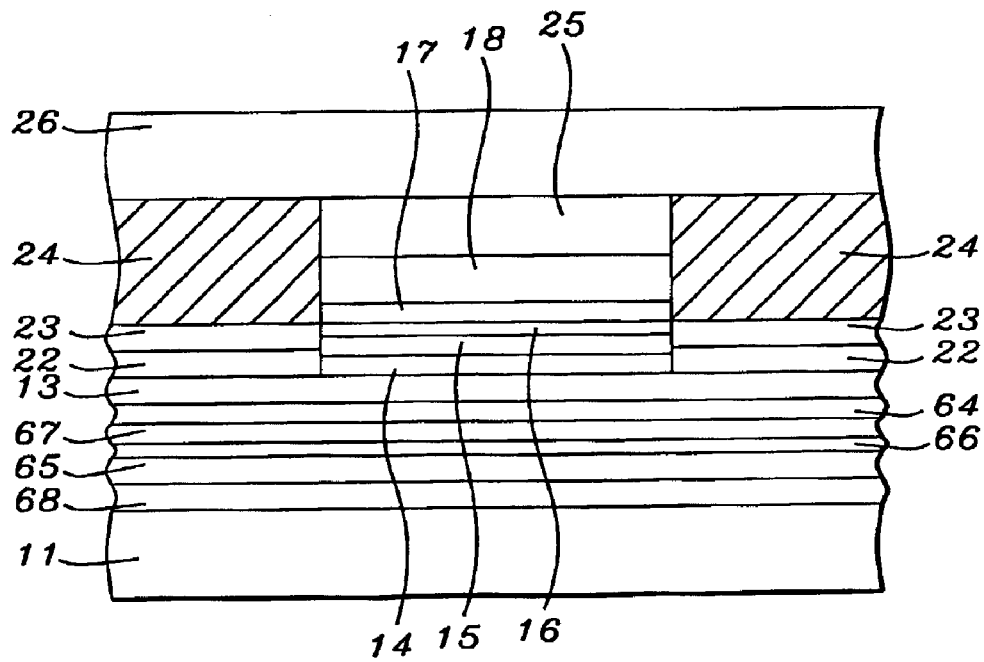
FIG. 6 shows a second embodiment of the present invention.

We refer now to FIG. 6 for a description of the second embodiment of the invention which was mentioned earlier. The process and structure are similar to that seen in FIG. 5 except that, the bottom antiferromagnetic layer (layer 12), is replaced by a second spin valve. This second spin valve is, in effect, a mirror reflection of layers 14 through 17.

Thus, bottom antiferromagnetic layer 68 is deposited onto lower conductive magnetic shield 11, whose conductance is enhanced by a layer of copper and/or gold and which is between about 100 and 300 Angstroms thick. This is followed by a ferromagnetic layer which is then magnetized in a first direction to become AP4 layer 65. AP4 is between about 10 and 30 Angstroms thick and is of CoFe, Co, or CoFeB. Then antiferromagnetic coupling layer 66 (between about 3 and 10 Angstroms thick and of Ru or Rh) is deposited on AP4 layer 65, followed by another ferromagnetic layer which is then magnetized in a second direction, antiparallel to the first direction, to become AP3 layer 67. AP3 is between about 15 and 30 Angstroms thick and is also of CoFe, Co, or CoFeB.

An additional copper spacer layer 64 is then deposited onto AP3 layer 67. Layer 64 is between about 20 and 50 Angstroms thick. From here on the process proceeds as described above for the embodiment illustrated in FIG. 5—ion milling in the presence of a suitable photoresist mask to pattern the CPP structure into a pillar. The end point for etching was also controlled by SIMS to be at the interface between copper apacer 14 and the free layer.

What is claimed is:

1. A process to manufacture a CPP GMR read head structure, comprising:

(a) providing a lower magnetic shield, formed of conductive material, and depositing thereon a bottom antiferromagnetic layer;

(b) depositing a free layer on said bottom antiferromagnetic layer;

(c) depositing a copper spacer layer and, on said spacer layer, depositing a ferromagnetic layer which is then magnetized in a first direction whereby it becomes an AP1 layer;

(d) depositing an antiferromagnetic coupling layer on AP1 and, on said antiferromagnetic coupling layer, depositing a ferromagnetic layer which is then magnetized in a second direction that is antiparallel to said first direction, whereby it becomes an AP2 layer;

(e) depositing a top antiferromagnetic layer on said AP2 layer and then a conductive layer on said top antiferromagnetic layer;

performing steps (a) through (e) during a single pumpdown, thereby forming a CPP structure;

then, by means of ion milling in the presence of a photoresist mask, patterning said CPP structure to form a pillar whose shape and location define a spin valve stack;

with said photoresist mask still in place, depositing, in succession, a ferromagnetic bias layer, an edge antiferromagnetic layer, and an insulating layer;

then lifting off said photoresist mask thereby exposing said conductive layer; and then depositing on the structure an upper magnetic shield.

2. The process described in claim 1 wherein said free layer is between about 20 and 100 Angstroms thick and is selected from the group consisting of NiFe, CoFe, and NiFeCo.

3. The process described in claim 1 wherein said ferromagnetic bias layer is between about 20 and 100 Angstroms thick and is selected from the group consisting of NiFe, CoFe, and CoFeB.

4. The process described in claim 1 wherein said antiferromagnetic bias layer is between about 50 and 150 Angstroms thick and is selected from the group consisting of PtMn, IrMn, and NiMn.

5. The process described in claim 1 wherein said insulating layer is selected from the group consisting of aluminum oxide and tantalum oxide.

6. The process described in claim 1 wherein said AP1 layer is between about 15 and 30 Angstroms thick and is selected from the group consisting of CoFe, Co, and CoFeB.

7. The process described in claim 1 wherein said antiferromagnetic coupling layer is between about 5 and 10 Angstroms thick and is selected from the group consisting of Ru and Rh.

8. The process described in claim 1 wherein said AP2 layer is between about 15 and 30 Angstroms thick and is selected from the group consisting of CoFe and Co.

9. The process described in claim 1 wherein said conductive layer is between about 100 and 300 Angstroms thick and is selected from the group consisting of Cu and Au.

10. The process described in claim 1 wherein said top antiferromagnetic layer is between about 50 and 150 Angstroms thick and is selected from the group consisting of PtMn, IrMn, and NiMn.

11. The process described in claim 1 wherein said free layer is between about 20 and 100 Angstroms thick and is selected from the group consisting of NiFe, CoFe, and NiFeCo.

12. The process described in claim 1 wherein said spacer layer is between about 20 and 50 Angstroms thick.

13. The process described in claim 1 wherein said pillar, at said upper surface, has dimensions of about 0.1 by 0.3 microns.

14. A process to manufacture a CPP dual spin valve read head structure, comprising:

(a) providing a lower magnetic shield, formed of conductive material, and depositing thereon a bottom antiferromagnetic layer;

(b) on said bottom antiferromagnetic layer, depositing a ferromagnetic layer which is then magnetized in a first direction whereby it becomes an AP4 layer;

(c) then depositing a first antiferromagnetic coupling layer on AP4 and, on said first antiferromagnetic coupling layer, depositing a ferromagnetic layer which is then magnetized in a second direction that is antiparallel to said first direction, whereby it becomes an AP3 layer;

(d) depositing a first copper spacer layer on said AP3 layer a free layer on said first copper spacer layer;

(e) then depositing a second copper spacer layer and, on said second spacer layer, depositing a ferromagnetic layer which is then magnetized in said first direction whereby it becomes an AP1 layer;

(f) then depositing a second antiferromagnetic coupling layer on AP1 and, on said second antiferromagnetic coupling layer, depositing a ferromagnetic layer which is then magnetized in a second direction that is antiparallel to said first direction, whereby it becomes an AP2 layer;

(g) depositing a top antiferromagnetic layer on said AP2 layer and then a conductive layer on said top antiferromagnetic layer;

performing steps (a) through (g) during a single pumpdown, thereby forming a CPP structure;

then, by means of ion milling in the presence of a photoresist mask, patterning said CPP structure to form a pillar whose shape and location define a spin valve stack;

with said photoresist mask still in place, depositing, in succession, a ferromagnetic bias layer, an edge antiferromagnetic layer, and an insulating layer;

then lifting off said photoresist mask thereby exposing said conductive layer; and then depositing on the structure an upper magnetic shield.

15. The process described in claim 14 wherein said lower shield is between about 100 and 300 Angstroms thick and is selected from the group consisting of Cu and Au.

16. The process described in claim 14 wherein said upper shield is between about 100 and 300 Angstroms thick and is selected from the group consisting of Cu and Au.

17. The process described in claim 14 wherein said AP4 layer is between about 15 and 30 Angstroms thick and is selected from the group consisting of CoFe, Co, and CoFeB.

18. The process described in claim 14 wherein said first antiferromagnetic coupling layer is between about 5 and 10 Angstroms thick and is selected from the group consisting of Ru and Rh.

19. The process described in claim 14 wherein said AP3 layer is between about 15 and 30 Angstroms thick and is selected from the group consisting of CoFe, Co, and CoFeB.

20. The process described in claim 14 wherein said first spacer layer is between about 20 and 50 Angstroms thick.

21. The process described in claim 14 wherein said second spacer layer is between about 20 and 50 Angstroms thick.

22. The process described in claim 14 wherein said free layer is between about 20 and 100 Angstroms thick and is selected from the group consisting of NiFe, CoFe, and CoFeCo.

23. A GMR read head structure, comprising:

a lower magnetic shield, formed of conductive material, on which is a bottom antiferromagnetic layer;

a free layer on said bottom antiferromagnetic layer;

over said free layer, a central area, that defines a CPP pillar structure, and a peripheral area on opposing sides of said central area;

in said central area:

on said free layer, a copper spacer layer and, on said spacer layer, a ferromagnetic AP1 layer which has been magnetized in a first direction;

an antiferromagnetic coupling layer on AP1 and, on said antiferromagnetic coupling layer, a ferromagnetic layer which has been magnetized in a second direction that is antiparallel to said first direction, whereby it is an AP2 layer;

a top antiferromagnetic layer on said AP2 layer and a conductive layer, having a first upper surface, on said AP2 layer;

in said periperal area:

a ferromagnetic bias layer on said free layer and an antiferromagnetic bias layer on said ferromagnetic bias layer;

on said antiferromagnetic bias layer, an insulating layer having a second upper surface, said first and second upper surfaces being coplanar; and an upper magnetic shield on both said upper surfaces.

24. The read head described in claim 23 wherein said free layer is between about 20 and 100 Angstroms thick and is selected from the group consisting of NiFe, CoFe, and NiFeCo.

25. The read head described in claim 23 wherein said ferromagnetic bias layer is between about 20 and 100 Angstroms thick and is selected from the group consisting of NiFe and CoFe.

26. The read head described in claim 23 wherein said antiferromagnetic bias layer is between about 50 and 150 Angstroms thick and is selected from the group consisting of PtMn, IrMn, and NiMn.

27. The read head described in claim 23 wherein said insulating layer is selected from the group consisting of aluminum oxide and tantalum oxide.

28. The read head described in claim 23 wherein said AP1 layer is between about 15 and 30 Angstroms thick and is selected from the group consisting of CoFe and Co.

29. The read head described in claim 23 wherein said antiferromagnetic coupling layer is between about 5 and 10 Angstroms thick and is selected from the group consisting of Ru and Rh.

30. The read head described in claim 23 wherein said AP2 layer is between about 15 and 30 Angstroms thick and is selected from the group consisting of CoFe and Co.

31. The read head described in claim 23 wherein said conductive layer is between about 100 and 300 Angstroms thick and is selected from the group consisting of Cu and Au.

32. The read head described in claim 23 wherein said top antiferromagnetic layer is between about 50 and 150 Angstroms thick and is selected from the group consisting of PtMn, IrMn, and NiMn.

33. The read head described in claim 23 wherein said free layer is between about 20 and 100 Angstroms thick and is selected from the group consisting of NiFe, CoFe, and NiFeCo.

34. The read head described in claim 23 wherein said spacer layer is between about 20 and 50 Angstroms thick.

35. The read head described in claim 23 wherein said central area, at said first upper surface, has dimensions of about 0.1 by 0.3 microns.

36. A CPP dual spin valve read head structure, comprising:

a lower magnetic shield, formed of conductive material, on which is a bottom antiferromagnetic layer;

on said bottom antiferromagnetic layer, a ferromagnetic layer which has been magnetized in a first direction whereby it is an AP4 layer;

a first antiferromagnetic coupling layer on AP4 and, on said first antiferromagnetic coupling layer, a ferromagnetic layer which has been magnetized in a second direction that is antiparallel to said first direction, whereby it is an AP3 layer;

a first copper spacer layer on said AP3 layer and a free layer on said first copper spacer layer;

a ferromagnetic bias layer on said free layer and an antiferromagnetic bias layer on said ferromagnetic bias layer;

a non-magnetic insulating layer, having a first upper surface, on said antiferromagnetic bias layer;

a centrally located cavity that extends downwards from said first upper surface as far as said free layer, said cavity defining a shape and a location for a dual spin valve stack;

in said cavity, on said free layer, a second copper spacer layer and, on said second spacer layer, a ferromagnetic layer which has been magnetized in said first direction whereby it is an AP1 layer;

in said cavity, a second antiferromagnetic coupling layer on AP1 and, on said second antiferromagnetic coupling layer, a ferromagnetic layer which has been magnetized in a second direction that is antiparallel to said first direction, whereby it is an AP2 layer;

in said cavity, a top antiferromagnetic layer on said AP2 layer and a conductive layer, having a second upper surface, on said AP2 layer;

said first and second upper surfaces being coplanar; and an upper magnetic shield on said upper surfaces.

37. The read head described in claim 36 wherein said lower shield is between about 100 and 300 Angstroms thick and is selected from the group consisting of Cu and Au.

38. The read head described in claim 36 wherein said upper shield is between about 100 and 300 Angstroms thick and is selected from the group consisting of Cu and Au.

39. The read head described in claim 36 wherein said AP4 layer is between about 15 and 30 Angstroms thick and is selected from the group consisting of CoFe, Co, and CoFeB.

40. The read head described in claim 36 wherein said first antiferromagnetic coupling layer is between about 5 and 10 Angstroms thick and is selected from the group consisting of Ru and Rh.

41. The read head described in claim 36 wherein said AP3 layer is between about 15 and 30 Angstroms thick and is selected from the group consisting of CoFe, Co, and CoFeB.

42. The read head described in claim 36 wherein said first spacer layer is between about 20 and 50 Angstroms thick.

43. The read head described in claim 36 wherein said second spacer layer is between about 20 and 50 Angstroms thick.

44. The read head described in claim 36 wherein said free layer is between about 20 and 100 Angstroms thick and is selected from the group consisting of NiFe, CoFe, and NiFeCo.

* * * * *